(12) United States Patent
Kim et al.

(10) Patent No.: US 10,681,365 B2
(45) Date of Patent: Jun. 9, 2020

(54) IMAGE TRANSMITTING DEVICE

(71) Applicant: LG ELECTRONICS INC., Seoul (KR)

(72) Inventors: Dongsung Kim, Seoul (KR); Sungbo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 16/010,351

(22) Filed: Jun. 15, 2018

(65) Prior Publication Data

US 2019/0342569 A1    Nov. 7, 2019

(30) Foreign Application Priority Data

May 4, 2018 (KR) ........................ 10-2018-0052165

(51) Int. Cl.
*H04N 19/46* (2014.01)
*H04N 19/186* (2014.01)
*H04N 19/42* (2014.01)

(52) U.S. Cl.
CPC ........... *H04N 19/46* (2014.11); *H04N 19/186* (2014.11); *H04N 19/42* (2014.11)

(58) Field of Classification Search
CPC ....... H04N 19/46; H04N 19/186; H04N 19/42
See application file for complete search history.

(56) References Cited

U.S. PATENT DOCUMENTS

| | | | | |
|---|---|---|---|---|
| 2003/0002581 A1* | 1/2003 | Moni | ................... | H04N 19/176 375/240.03 |
| 2008/0069457 A1* | 3/2008 | Matsumoto | .......... | H04N 19/176 382/232 |
| 2011/0007979 A1 | 1/2011 | Goma | | |
| 2011/0298818 A1* | 12/2011 | Mori | .................... | G09G 3/3208 345/589 |
| 2017/0064379 A1 | 3/2017 | Lee et al. | | |
| 2018/0063218 A1* | 3/2018 | Kim | .................... | H04N 19/115 |
| 2018/0103230 A1* | 4/2018 | Vitta | ..................... | H04N 19/59 |

FOREIGN PATENT DOCUMENTS

| | | | |
|---|---|---|---|
| EP | 2357633 | 8/2011 | |
| EP | 3136741 | 3/2017 | |
| EP | 3136741 A1 * | 3/2017 | ....... H04N 21/43635 |
| EP | 3288273 | 2/2018 | |

OTHER PUBLICATIONS

European Patent Office Application Serial No. 18193091.8, Partial Search Report dated Oct. 22, 2018, 14 pages.
European Patent Office Application Serial No. 18193091.8, Search Report dated Jan. 17, 2019, 14 pages.

* cited by examiner

*Primary Examiner* — Jonathan R Messmore
(74) *Attorney, Agent, or Firm* — Lee, Hong, Degerman, Kang & Waimey PC

(57) ABSTRACT

The present disclosure relates to an image transmitting device capable of transmitting an image to be input to a receiving side by changing a compression ratio of the image according to wireless quality and a type of the image. An image transmitting device according to an embodiment of the present disclosure includes a processor configured to determine a type of a content image input from the outside and determine a compression ratio according to the determined type of the content image, a compression unit configured to compress the content image based on the determined compression ratio, and a wireless communication unit configured to wirelessly transmit the compressed content image to an image receiving device.

13 Claims, 7 Drawing Sheets

IMAGE TRANSMITTING DEVICE

CROSS-REFERENCE TO RELATED APPLICATIONS

The present application claims priority under 35 U.S.C. 119 and 35 U.S.C. 365 to Korean Patent Application No. 10-2018-0052165 (filed on 4, May, 2018), which is hereby incorporated by reference in its entirety.

BACKGROUND

The present disclosure relates to an image transmitting device capable of compressing and transmitting an image.

As image technology was changed from an analog method to a digital method, development progressed from standard definition (SD) to high definition (HD) in order to provide an image much closer to an actual screen. The SD supports a resolution of 704×480 and includes about 350 thousand pixels. The HD is classified into Full-HD and HD. Among these, the Full-HD supporting higher resolution has a resolution of 1,920×1,080, includes 2 million pixels, and provides an image having image quality much higher than that of the SD.

Recently, image technology has grown into ultra high-definition (UHD) a step further beyond the above-described Full-HD. The UHD for supporting ultra-high definition and ultra high resolution is being spotlighted as a next generation media environment. The UHD supports a resolution of 4K (3,840×2,160), a resolution of 8K (7,680×4,320), and a 22.2-channel surround audio. In the case of the above-described UHD, the UHD supporting a resolution of 4K provides image quality 4 times clearer than that of the HD, and the UHD supporting a resolution of 8K provides image quality 16 times clearer than that of the HD.

On the other hand, if such a UHD image is output to an external output device in real time, a user should not feel uncomfortable in viewing the UHD image, such as if an image is broken or a wireless link is disconnected.

SUMMARY

Embodiments provide an image transmitting device capable of transmitting an image to be input to a receiving side by changing a compression ratio of the image according to a type of wireless quality, a type of the image, and a type of a connected external device.

In one embodiment, an image transmitting device includes: a processor configured to determine a type of a content image input from the outside and determine a compression ratio according to the determined type of the content image; a compression unit configured to compress the content image based on the determined compression ratio; and a wireless communication unit configured to wirelessly transmit the compressed content image to an image receiving device.

In another embodiment, an image transmitting device includes: an external interface configured to receive a content image from an external device; a processor configured to determine a type of the external device and determine a compression ratio according to the determined type of the external device; a compression unit configured to compress the content image based on the determined compression ratio; and a wireless communication unit configured to wirelessly transmit the compressed content image to an image receiving device.

DETAILED DESCRIPTION OF THE EMBODIMENTS

Hereinafter, embodiments related to the present disclosure will be described in detail with reference to the drawings. The suffix "module" and "unit" for components, which are used in the description below, are assigned and mixed in consideration of only the easiness in writing the specification. That is, the suffix itself does not have different meanings or roles.

An image transmitting device according to an embodiment of the present disclosure may be, for example, an intelligent image display device that is also equipped with a computer supporting function in addition to a broadcast program receiving function. Accordingly, since the image receiving device is committed (or devoted) to the broadcast program receiving function and is also supplemented with an internet function or the like, the image receiving device may be equipped with an interface that can be more conveniently used as compared to an hand-writing type input device, a touch screen, a space remote controller, or the like. Furthermore, since a wired or wireless internet function is supported for the image receiving device, the image receiving device may be connected to (or may access) the internet and a computer to perform a function such as email transmission, web browsing, internet banking, or gaming. In order to perform such variety of functions, the image receiving device may adopt a standardized OS for general purpose.

Therefore, since a variety of applications may be easily added to or deleted within an OS kernel for general purpose, the image transmitting device described in the present disclosure may, for example, perform a wide range of user-friendly functions.

Figure 1:
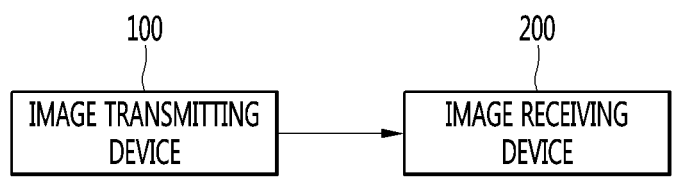
FIGS. 1 to 3 are block diagrams illustrating a configuration of a display system according to an embodiment of the present disclosure.
Figure 2:
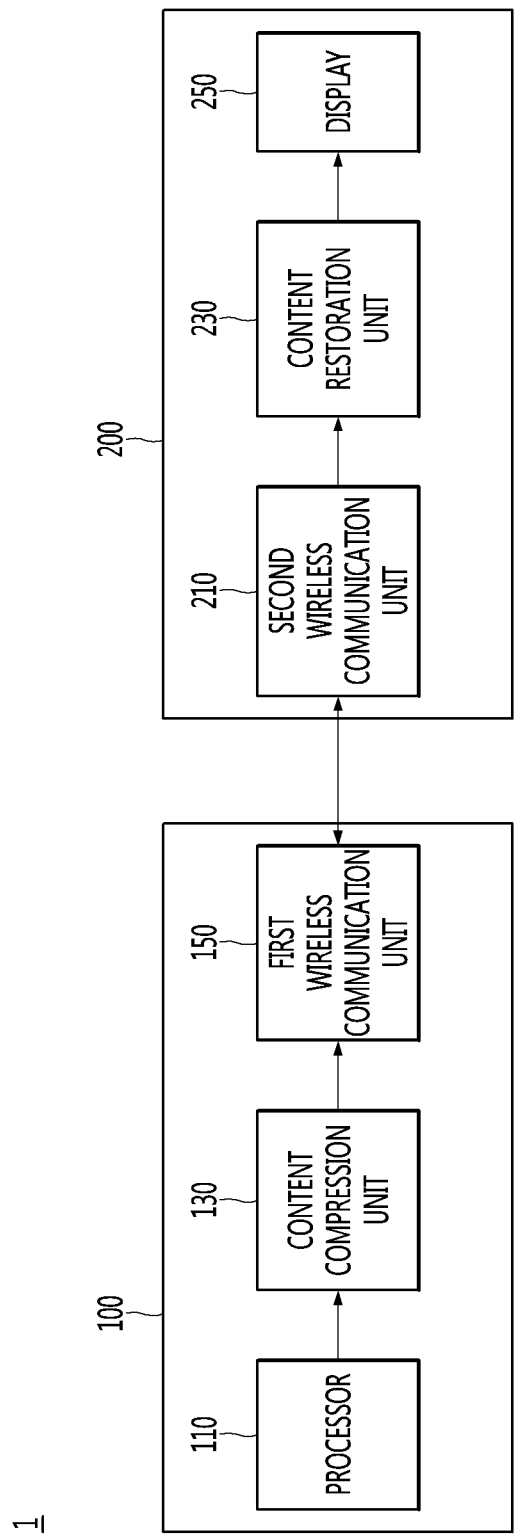
Figure 3:
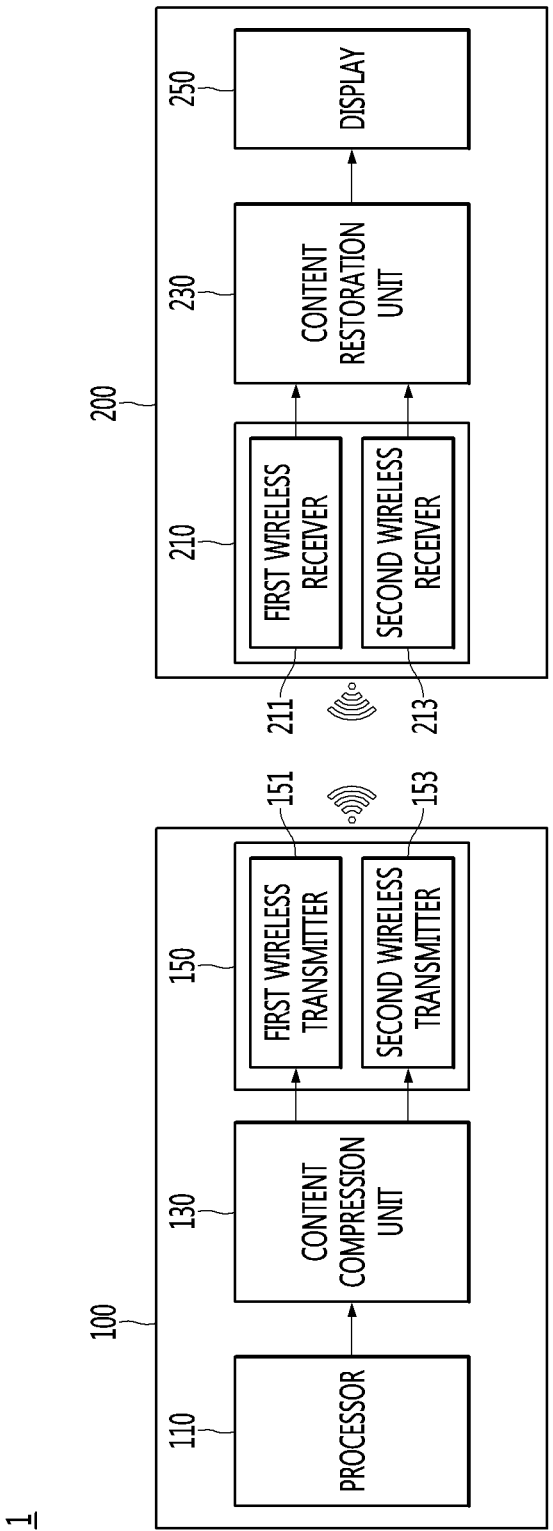

FIGS. 1 to 3 are block diagrams illustrating a configuration of a display system 1 according to an embodiment of the present disclosure.

Referring to FIG. 1, the display system 1 according to the embodiment of the present disclosure includes an image transmitting device 100 and an image receiving device 200.

The image transmitting device 100 may be a device capable of encoding a content image and wirelessly transmitting the encoded content image.

The image receiving device 200 may be a display device capable of receiving encoded content wirelessly and decoding the received content.

The video transmitting device 100 100 and the image receiving device 200 may constitute a video wall display system.

In video walls, having a thin bezel on the display plays an important role in the visualization of the content image. For the thin bezel of a display, it is efficient to have only the components that can do a minimal role, and the circuitry for the main function, or components, in a separate device.

The image transmitting device 100 may determine a type of a content image input from the outside and may determine a compression ratio of the content image based on the determined type. The compression ratio of the content image may indicate a ratio in which a data size of the content image is compressed.

The image transmitting device 100 may compress the content image according to the determined compression ratio and may wirelessly transmit the compressed content image to the image receiving device 200.

The image receiving device 200 may restore the compressed content image received from the image transmitting device 100 and may display the restored content image on a display.

FIG. 2 is a block diagram illustrating detailed configurations of the image transmitting device 100 and the image receiving device 200.

Referring to FIG. 2, the image transmitting device 100 may include a processor 110, a content compression unit 130, and a first wireless communication unit 150.

The processor 110 may control an overall operation of the image transmitting device 100. The processor 110 may be in the form of a "system-on-chip (SoC)".

The processor 110 may determine a compression ratio of an audio or a video input from the outside according to a type of a content image and may transmit at least one of the audio and video to the content compression unit 130 according to the determined compression ratio.

The content compression unit 130 may complements content image breakage or wireless-link disconnection by changing a compression ratio of a content image according to wireless quality. The content image may include at least one of an audio and a video.

If wireless quality is not good, the content compression unit 130 may decrease a data transmission rate (i.e., increase a compression ratio).

If wireless quality is good, the content compression unit 130 may increase a data transmission rate (i.e., decrease a compression ratio).

The content compression unit 130 may be referred to as an encoder.

The first wireless communication unit 150 may wirelessly transmit a content image compressed by the content compression unit 130 to the image receiving device 200.

Referring to FIG. 3, the first wireless communication unit 150 may include a first wireless transmitter 151 and a second wireless transmitter 153.

The first wireless communication unit 150 may transmit the compressed content image to a second wireless communication unit 210 of the image receiving device 200 through two channels.

That is, the first wireless transmitter 151 may transmit the compressed content image to a first wireless receiver 211 of the image receiving device 200, and the second wireless transmitter 153 may transmit the compressed content image to a second wireless receiver 213 thereof.

According to an embodiment of the present disclosure, the two channels are used because the compressed content image is transmitted through a channel having better wireless quality to reduce a transmission delay.

According to another embodiment of the present disclosure, the two channels are used because, in the case of a content video having a 4K resolution, the data capacity is large, the content video may be divided and transmitted through two channels.

Each of the first wireless transmitter 151 and the second wireless transmitter 153 may include a baseband module for baseband communication and a radio frequency (RF) module for RF communication.

The baseband module may generate unmodulated low frequency band data on the compressed content image to transmit the generated low frequency band data to the RF module.

The RF module may convert the low frequency band data into high frequency band data according to an RF communication standard and may transmit the converted high frequency band data on the content image to the image receiving device 200.

The image receiving device 200 may include the second wireless communication unit 210, a content restoration unit 230, and a display 250.

The second wireless communication unit 210 may include the first wireless receiver 211 and the second wireless receiver 213.

That is, the second wireless communication unit 210 may also include two channels.

Each of the first wireless receiver 211 and the second wireless receiver 213 may include a baseband module for baseband communication and an RF module for RF communication.

The RF module may receive high frequency band data from the image transmitting device 100.

The baseband module may convert the high frequency band data into low frequency band data.

The content restoration unit 230 may decode the content image received through the second wireless communication unit 210.

The content restoration unit 230 may restore the compressed content image into a content image having an original size The content restoration unit 230 may be referred to as a decoder.

The display 250 may display the restored content image.

Figure 4:
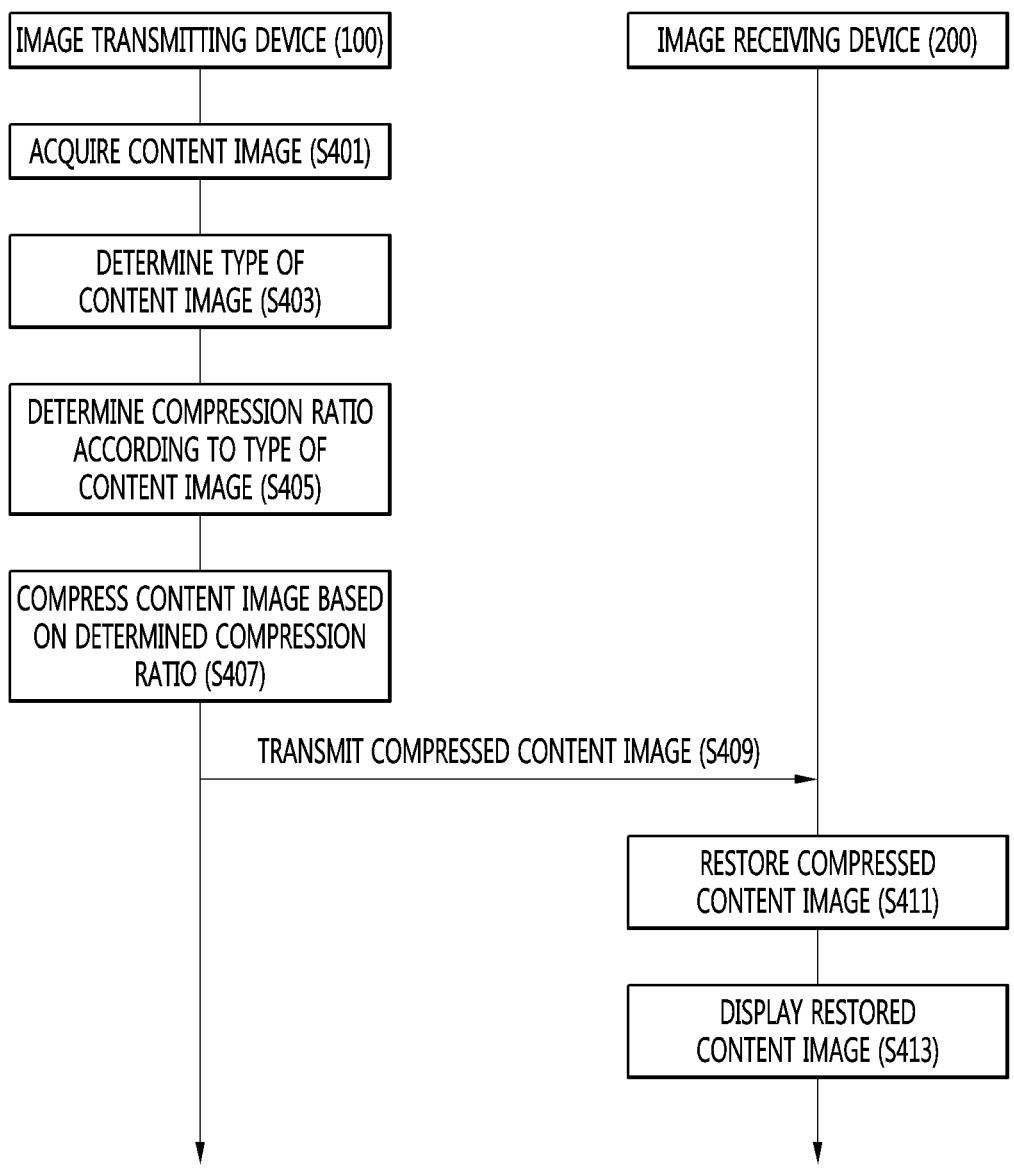
FIG. 4 is a ladder diagram describing an operating method of a display system, according to an embodiment of the present disclosure.

FIG. 4 is a ladder diagram describing an operating method of the display system, according to the embodiment of the present disclosure.

The processor 110 of the image transmitting device 100 acquires a content image (S401).

In an embodiment, the image transmitting device 100 may receive the content image through an external interface.

The external interface may include an external input terminal such as a high definition multimedia interface (HDMI).

In another embodiment, the image transmitting device 100 may acquire the content image through an internal storage.

The processor 110 of the image transmitting device 100 determines a type of the acquired content image (S403).

The type of the content image may be any one of a still image and a moving image.

The moving image may be any one of a general moving image and a game moving image.

In an embodiment, the processor 110 may detect a peak value difference of an average picture level (APL) of an input content image and may determine whether the content image is a still image or a moving image.

The processor 110 may periodically detect the peak value difference of the APL to determine the type of the input content image. The time interval for detecting the peak value difference of the APL may be 0.5 seconds, but this is merely an example.

Specifically, if there is no peak value difference of an APL, the processor 110 may determine that a type of a corresponding content image is a still image.

If there is a peak value difference of an APL, the processor 110 may determine that a type of a corresponding content image is a moving image.

In another embodiment, if a content image is a moving image, the processor 110 may determine whether the moving image is a general moving image or a game moving image.

If a game machine is connected through an external interface configured to receive a content image and a game moving image is received from the game machine, the processor 110 may determine that a type of a moving image is the game moving image.

The processor 110 may determine that a moving image except the game moving image is a general moving image.

As will be described later, the processor 110 may set a compression ratio of the game moving image and a compression ratio of the general moving image so as to be different from each other.

In another embodiment, the processor 110 may determine whether a content image is a still image or a moving image, based on a motion of an object included in the content image.

Specifically, if there is a motion of the object included in the content image, the processor 110 may determine that the content image is a moving image. If there is no motion of the object, the processor 110 may determine that the content image is a still image.

The processor 110 of the image transmitting device 100 may determine a compression ratio according to the determine type of the content image (S405).

In an embodiment, if the determined type of the content image is a type of a still image, the processor 110 may determine that a compression ratio of the content image is a first compression ratio. The first compression ratio may be a basic compression ratio.

For example, the first compression ratio may indicate one quarter of a data size of an original content image.

In another embodiment, if the determined type of the content image is a game moving image, the processor 110 may determine that a compression ratio of the content image is a second compression ratio. The second compression ratio may be a minimum compression ratio.

For example, the second compression ratio may indicate a half of a data size of an original content image.

In another embodiment, if the determined type of the content image is a general moving image, the processor 110 may determine that a compression ratio of the content image is a third compression ratio. The third compression ratio may be a maximum compression ratio.

For example, the third compression ratio may be a ratio in a range within a range of 1/5 times to 1/10 times a data size of an original content image.

The content compression unit 130 of the image transmitting device 100 compresses the content image based on the determined compression ratio (S407).

The content compression unit 130 may compress the content image based on the compression ratio determined according to the type of the content image.

The first wireless communication unit 150 of the image transmitting device 100 wirelessly transmits the compressed content image to the second wireless communication unit 210 of the image receiving device 200 (S409).

The content restoration unit 230 of the image receiving device 200 restores the received compressed content image (S411).

In an embodiment, the content restoration unit 230 may restore a data size of the compressed content image into an original data size.

The content restoration unit 230 may decompress the content image. This may be referred to as a decoding process.

The display 250 of the image receiving device 200 displays the restored content image (S250).

Figure 5:
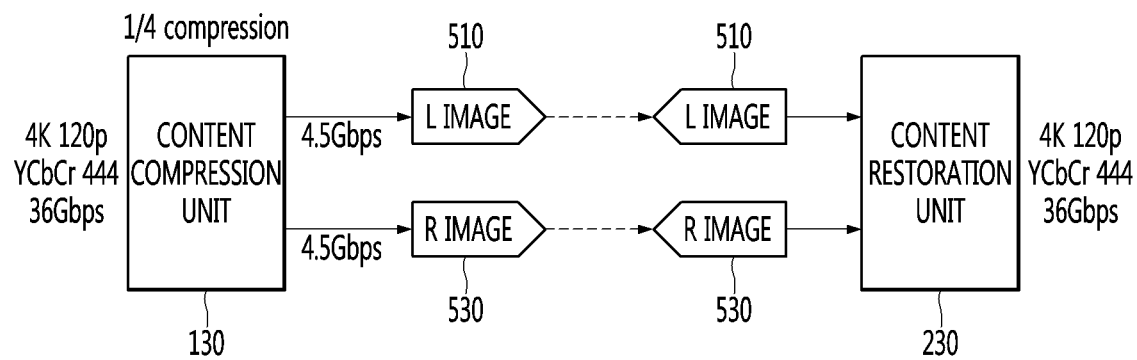
FIG. 5 is a diagram describing processes of compressing and transmitting a still image if a type of a content image is the still image, according to an embodiment of the present disclosure.

FIG. 5 is a diagram describing processes of compressing and transmitting a still image if a type of a content image is the still image, according to an embodiment of the present disclosure.

Referring to FIG. 5, the content compression unit 130 may compress a still image having a resolution of 4k 120p to a compression ratio of 1/4.

The resolution of 4K 120p may represent next-generation high-definition resolution having a horizontal resolution of 4k pixels.

In addition, it is assumed that YCbCr (color space) of the still image has a component ratio of 4:4:4.

A Y component of YCbCr is a luminance component, and Cb and Cr components are color difference components. YCbCr is not an absolute color space and is one way to encode RGB information.

In FIG. 5, it is assumed that a ratio of the Y component, the Cb component, and the Cr component of the still image is 4:4:4.

The first wireless communication unit 150 of the image transmitting device 100 may transmit the content image compressed to a compression ratio of 1/4 to the image receiving device 200 through two channels.

That is, the first wireless transmitter 151 and the second wireless transmitter 153 included in the first wireless communication unit 150 may transmit an L image 510 and an R image 530 compressed to a compression ratio of 1/4 to the image receiving device 200, respectively.

In this case, each of the L image 510 and the R image 530 may have a resolution of 2K 120p, which is a half of 4k 120p. The L image 510 and the R image 530 may have different resolutions but may be the same image.

The image transmitting device 100 may transmit a compressed content in an environment of a channel having better wireless quality among the two channels. This will be described below.

Figure 6:
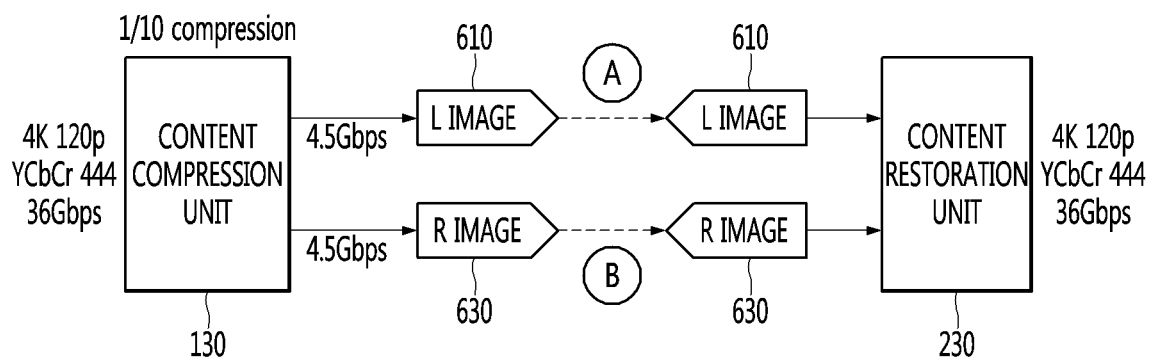
FIG. 6 is a diagram describing processes of compressing and transmitting a general moving image if a type of a content image is the general moving image, according to an embodiment of the present disclosure

FIG. 6 is a diagram describing processes of compressing and transmitting a general moving image if a type of a content image is the general moving image, according to an embodiment of the present disclosure Referring to FIG. 6, the content compression unit 130 may compress a general moving image having a resolution of 4k 120p to a compression ratio of 1/10.

In addition, it is assumed that YCbCr (color space) of the general moving image has a component ratio of 4:4:4.

The first wireless communication unit 150 of the image transmitting device 100 may transmit a content image compressed to a compression ratio of 1/10 to the image receiving device 200 through the two channels.

That is, the first wireless transmitter 151 and the second wireless transmitter 153 included in the first wireless communication unit 150 may transmit an L image 610 and an R image 630 compressed to a compression ratio of 1/10 to the image receiving device 200, respectively.

In this case, each of the L image 610 and the R image 630 may have a resolution of 2K 120p, which is a half of 4k 120p.

In an embodiment, only any one image of the L image 610 and the R image 630 may be transmitted to the image receiving device 200 according to wireless quality.

The image receiving device 200 may select a path having better wireless quality among path A and path B. The image receiving device 200 may receive a content image 600 through the selected path.

In an embodiment, the image receiving device 200 may detect a packet error and may determine a state of wireless quality based on the detected packet error.

For example, if a ratio of the detected packet error is greater than or equal to a preset ratio, the image receiving device 200 may determine that wireless quality is poor. If the ratio of the detected packet error is less than the preset ratio, the image receiving device 200 may determine that wireless quality is good.

In another embodiment, the image receiving device 200 may determine a state of wireless quality by using data reception sensitivity.

For example, if data reception sensitivity is greater than or equal to certain sensitivity, the image receiving device 200 may determine that wireless quality is good. If the data reception sensitivity is less than the certain sensitivity, the image receiving device 200 may determine that wireless quality is poor.

In another embodiment, the image receiving device 200 may determine a state of wireless quality by using intensity of an RF signal.

For example, if intensity of received RF signal is greater than or equal to preset intensity, the image receiving device 200 may determine that wireless quality is good. If the intensity of the received RF signal is less than the preset intensity, the image receiving device 200 may determine that wireless quality is poor.

The image receiving device 200 may determine a state of wireless quality and may select a path having better wireless quality among path A and path B.

Meanwhile, the image receiving device 200 may feed back state information on wireless quality into the image transmitting device 100.

The image transmitting device 100 may set a compression ratio of a content image based on the received state information on the wireless quality.

For example, if wireless quality condition is poor, the image transmitting device 100 may increase a compression ratio so as to decrease a data transmission rate. If wireless quality condition is good, the image transmitting device 100 may decrease the compression ratio to increase the data transmission rate.

Figure 7:
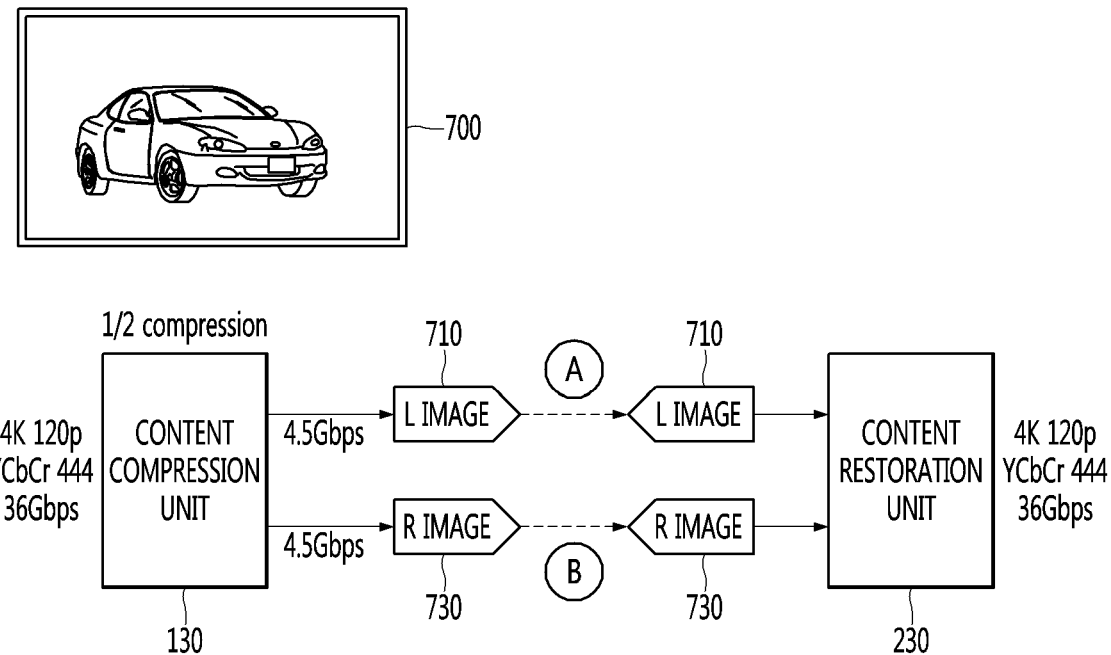
FIG. 7 is a diagram describing processes of compressing and transmitting a game moving image if a type of a content image is the game moving image, according to an embodiment of the present disclosure.

The setting of a channel (or a path) according to a state of wireless quality may be applied to embodiments of FIGS. 5 and 7.

FIG. 7 is a diagram describing processes of compressing and transmitting a game moving image if a type of a content image is the game moving image, according to an embodiment of the present disclosure.

Referring to FIG. 7, the content compression unit 130 may compress a game moving image 700 having a resolution of 4k 120p to a compression ratio of 1/2.

In addition, it is assumed that YCbCr (color space) of the game moving image 700 has a component ratio of 4:4:4.

The first wireless communication unit 150 of the image transmitting device 100 may transmit the game moving image compressed to a compression ratio of 1/2 to the image receiving device 200 through the two channels.

That is, the first wireless transmitter 151 and the second wireless transmitter 153 included in the first wireless communication unit 150 may transmit an L image 710 and an R image 730 compressed to a compression ratio of 1/2 to the image receiving device 200, respectively.

In this case, each of the L image 710 and the R image 730 may have a resolution of 4K 120p, which is the same as resolution of an original game moving image, i.e., the game moving image 700. Alternatively, the image transmitting device 100 may compress the original game moving image 700 to a compression ratio of 1/2 using color sub-sampling.

In a situation in which response speed of an image is important as in a game moving image, compression algorithm processing speed should be low. If it takes a long time to restore a compressed content image, a breakage phenomenon of the game moving image may occur.

Thus, the image transmitting device 100 may compress the game moving image 700 to a minimum compression ratio, i.e., a compression ratio of 1/2.

That is, in the case of the game moving image, since the problem of data latency rather than a compression ratio should be a high priority for a user, the image transmitting device 100 may minimize a compression ratio through color sub-sampling.

The color sub-sampling will be described later.

Figure 8:
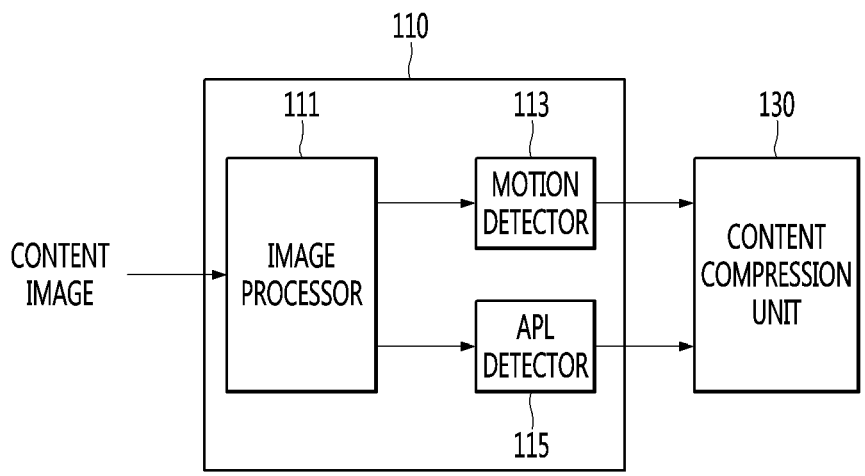
FIG. 8 is a block diagram illustrating a detailed configuration of a processor configured to determine a type of a content image, according to an embodiment of the present disclosure.

FIG. 8 is a block diagram illustrating a detailed configuration of the processor 110 configured to determine a type of a content image, according to an embodiment of the present disclosure.

Referring to FIG. 8, the processor 110 of the image transmitting device 100 may include an image processor 111, a motion detector 113, and an APL detector 115.

The image processor 111 may process a content image input from the outside.

The motion detector 113 may detect an object included in the processed content image and a motion of the object.

The motion detector 113 may detect whether there is a motion of the object, by using a motion vector.

If a motion vector value of the object is changed, the motion detector 113 may determine that a type of the content image is a moving image.

If the motion vector value of the object is fixed, the motion detector 113 may determine that a type of the content image is a still image.

The APL detector 115 may periodically detect an APL of the processed content image.

If there is a difference between the detected APLs, the APL detector 115 may periodically determine that the type of the content image is the moving image.

If there is no difference between the detected APLs, the APL detector 115 may periodically determine that the type of the content image is the still image.

In an embodiment, the processor 110 may include only one of the motion detector 113 and the APL detector 115.

In another embodiment, the motion detector 113 and the APL detector 115 may be configured separately from the processor 110.

The content compression unit 130 may adjust a compression ratio according to the detection result of the motion detector 113 or the APL detector 115.

According to an embodiment of the present disclosure, the image transmitting device 100 may adaptively change a compression ratio according to a source connected to the image transmitting device 100.

For example, if a personnel computer (PC) is connected to the image transmitting device 100 and a PC image is received, the image transmitting device 100 may determine that the PC image is a still image and may adjust a compression ratio of the PC image to a first compression ratio.

In another example, if a game machine is connected to the image transmitting device 100 and a game image is received, the image transmitting device 100 may adjust a compression ratio of the game image to a second compression ratio.

Figure 9:
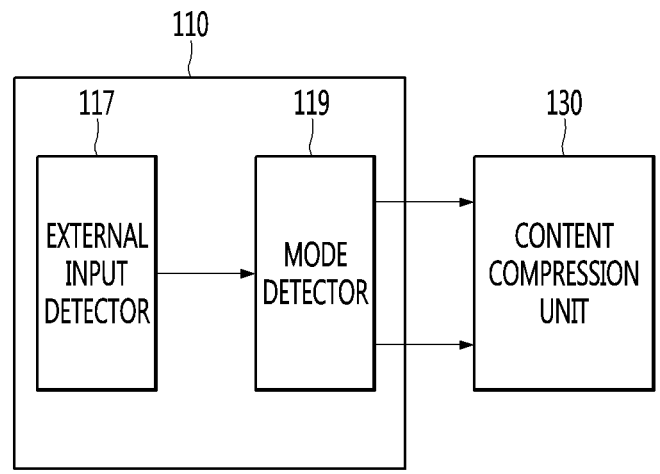
FIG. 9 is a block diagram illustrating a detailed configuration of a processor of an image transmitting device configured to determine a type of a moving image, according to an embodiment of the present disclosure.

FIG. 9 is a block diagram illustrating a detailed configuration of the processor 110 of the image transmitting device 100 configured to determine a type of a moving image, according to an embodiment of the present disclosure.

The processor 110 may include an external input detector 117 and a mode detector 119.

The external input detector 117 may determine whether an external device is connected to the image transmitting device 100. The external input detector 117 may detect that the external device is connected to the image transmitting device 100, by using a hot plug function.

The external input detector 117 may detect that the external device is connected to an external interface terminal (for example, an HDMI terminal).

The mode detector 119 may detect whether any external device is connected through an external interface. That is, the mode detector 119 may detect a type of an external device.

If a PC input is selected through an external input list displayed on the display 250 of the image receiving device 200, the mode detector 119 may determine that the PC is connected.

If a request for selecting a game mode is received on a UI menu displayed on the display 250 of the image receiving device 200, the mode detector 119 may determine that the game machine is connected.

A case in which the PC is connected to the image transmitting device 100 is referred to as a PC input mode, and a case in which the game machine is connected is referred to as a game mode.

If the PC is connected, the mode detector 119 may detect that an external input mode is a PC input mode, and if the game machine is connected, the mode detector 119 detect that an external input mode is a game mode.

In the case of the PC input mode, the content compression unit 130 may determine that a compression ratio of a content image is the first compression ratio or the third compression ratio.

That is, even in the case of the PC input mode, if an image input through the PC is a still image, the content compression unit 130 may determine that a compression ratio of a content image is the first compression ratio. If the image input through the PC is a general moving image, the content compression unit 130 may determine that a compression ratio of a content image is the third compression ratio.

The type of the image input through the PC may be determined by using the embodiment of FIG. 8.

In the case of the game mode, the content compression unit 130 may determine that a type of a content image is a game moving image and may determine that a compression ratio of the content image is the second compression ratio.

Figure 10:
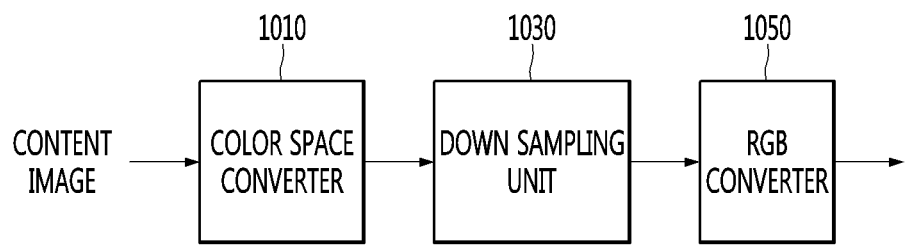
FIG. 10 is a diagram describing a process of compressing a game moving image through color sub-coupling if a type of a content image is the game moving image, according to an embodiment of the present disclosure.

FIG. 10 is a diagram describing a process of compressing a game moving image through color sub-coupling if a type of a content image is the game moving image, according to an embodiment of the present disclosure.

Referring to FIG. 10, the content compression unit 130 may include a color space converter 1010, a downsampling unit 1030, and an RGB converter 1050.

The color space converter 1010 may convert RGB data of a content image into color space (YCbCr) data.

The downsampling unit 1030 may downsample the converted color space data.

For example, if the color space data has a format of 4:4:4 (i.e., a ratio of a Y component, a Cb component, and a Cr component), the downsampling unit 1030 may downsample the format of 4:4:4 to a format of 4:2:2.

The downsampling may be referred to as color sub-sampling.

The downsampling may be a method of separating brightness data and color data to separately encode the brightness data and the color data by using a characteristic in which the human eye is insensitive to a change in a color as compared with a change in brightness.

More specifically, the downsampling may be a process of maintaining the brightness data and decreasing a data size of the color data.

That is, if the color space data has a format of 4:4:4 (i.e., a ratio of a Y component, a Cb component, and a Cr component), the downsampling unit 1030 may sample the color data by reducing a ratio of the color data to a format of 4:2:2.

In another embodiment, if the color space data has a format of 4:2:2 (i.e., a ratio of a Y component, a Cb component, and a Cr component), the downsampling unit 1030 may downsample the format of 4:2:2 to a format of 4:2:0.

In another embodiment, if the color space data has a format of 4:4:4 (i.e., a ratio of a Y component, a Cb component, and a Cr component), the downsampling unit 1030 may downsample the format of 4:4:4 to a format of 4:2:0.

The RGB converter 1050 may convert the downsampled color space data into the RGB data.

The converted RGB data may be transmitted to the image receiving device 200 through the first wireless communication unit 150 of the image transmitting device 100.

The color space converter 1010, the downsampling unit 1030, and the RGB converter 1050 may be included in the processor 110 of the image transmitting device 100.

Figure 11:
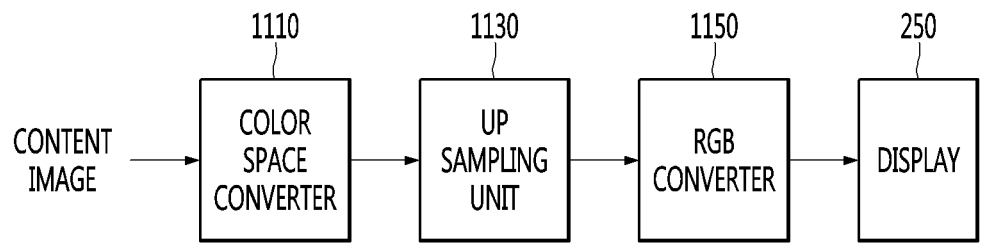
FIG. 11 is a diagram describing a process of restoring a game moving image through color sub-sampling if a type of a content image is the game moving image, according to an embodiment of the present disclosure.

FIG. 11 is a diagram describing a process of restoring a game moving image through color sub-sampling if a type of a content image is the game moving image, according to an embodiment of the present disclosure.

Referring to FIG. 11, the content restoration unit 230 of the image receiving device 200 may include a color space converter 1110, an upsampling unit 1130, and an RGB converter 1150.

The color space converter 1110 may convert RGB data received from the image transmitting device 100 into color space data. The RGB data received from the image transmitting device 100 may be downsampled data.

The upsampling unit 1130 may upsample the converted color space data. Upsampling may be a reverse operation of downsampling.

Specifically, the upsampling may be a process of restoring a size of color data into an original size of the color data.

For example, if the color space data has a format of 4:2:2 (i.e., a ratio of a Y component, a Cb component, and a Cr component), the upsampling unit 1130 may upsample the format of 4:2:2 to a format of 4:4:4.

If the color space data has a format of 4:2:0 (i.e., a ratio of a Y component, a Cb component, and a Cr component), the upsampling unit 1130 may upsample the format of 4:2:0 to an original ratio, i.e., a format of 4:2:2.

In another example, if the color space data has a format of 4:2:0 (i.e., a ratio of a Y component, a Cb component, and a Cr component), the upsampling unit 1130 may upsample the format of 4:2:0 to an original ratio, i.e., a format of 4:4:4.

The RGB converter 1150 may convert the upsampled color space data into the RGB data.

The display 250 of the image receiving device 200 may display an image by using the converted RGB data.

According to an embodiment of the present disclosure, a compression ratio may be changed according to various wireless environments and a type of an input image, so that an adaptive image may be transmitted. Therefore, an image may be transmitted without the breakage thereof, and wireless transmission quality may be improved.

According to an embodiment of the present disclosure, the above-described method may be implemented as a processor-readable code on a medium with a program recorded thereon. Examples of a processor-readable medium include read-only memory (ROM), random-access memory (RAM), CD-ROMs, magnetic tapes, floppy disks, and optical data storage devices.

As can be seen from the foregoing, the image transmitting device is not limited to the configuration and method of the embodiments described above, but all or some components of the embodiments may be configured to be selectively combined such that various modifications of the embodiments can be implemented.

What is claimed is:

1. An image transmitting device comprising:
a processor configured to determine a type of a content image input from the outside and determine a compression ratio according to the determined type of the content image;
a compression unit configured to compress the content image based on the determined compression ratio; and
a wireless communication unit configured to wirelessly transmit the compressed content image to an image receiving device,
wherein, when the type of the content image is a still image, the processor is further configured to determine that the compression ratio of the content image is a first compression ratio,
wherein, when the type of the content image is a general moving image, the processor is further configured to determine that the compression ratio of the content image is a second compression ratio, and the second compression ratio is higher than the first compression ratio,
wherein, when the type of the content image is a game moving image, the processor is further configured to determine that the compression ratio of the content image is a third compression ratio, and the third compression ratio is lower than the second compression ratio.

2. The image transmitting device according to claim 1, wherein the content compression unit converts RGB data on the game moving image into color space data, decreases a size of the converted color space data through color subsampling, and converts the color space data having the decreased size into the RGB data.

3. The image transmitting device according to claim 1, wherein the first compression ratio indicates one quarter of a data size of the content image, and the second compression ratio is in a range of 1/5 times to 1/10 times the data size of the content image.

4. The image transmitting device according to claim 1, wherein the third compression ratio indicates a half of a data size of the content image.

5. The image transmitting device according to claim 1, wherein the processor detects a motion vector value of an object included in the content image, determines that the type of the content image is a moving image if there is a change in the detected motion vector value, and determines that the type of the content image is a still image if there is no change in the detected motion vector value.

6. The image transmitting device according to claim 1, wherein the processor detects a peak value difference of an average picture level with respect to the content image, determines that the type of the content image is a moving image if there is the detected peak value difference, and determines that the type of the content image is a still image if there is no detected peak value difference.

7. The image transmitting device according to claim 1, wherein the wireless communication unit includes a first wireless transmitter and a second wireless transmitter so as to transmit the compressed content image to the image receiving device through two channels.

8. The image transmitting device according to claim 7, wherein the processor receives information on wireless quality from the image receiving device, determines wireless quality based on the received information, and transmits the compressed content image to the image receiving device through a channel having better wireless quality among the two channels.

9. An image transmitting device comprising:
an external interface configured to receive a content image from an external device;
a processor configured to determine a type of the external device and determine a compression ratio according to the determined type of the external device;
a compression unit configured to compress the content image based on the determined compression ratio; and
a wireless communication unit configured to wirelessly transmit the compressed content image to an image receiving device,
wherein, when the external device is a personnel computer (PC), the processor is further configured to determine that the compression ratio of the content image is a first compression ratio, and
wherein, when the external device is a game machine, the processor is further configured to determine that the compression ratio of the content image is a second compression ratio, and the second compression ratio is lower than the first compression ratio.

10. The image transmitting device according to claim 9, wherein, if the external device is a game machine, the content compression unit converts RGB data on a game moving image received from the game machine into color space data, decreases a size of the converted color space data through color sub-sampling, and converts the color space data having a decreased size into the RGB data.

11. The image transmitting device according to claim 1, wherein the processor is further configured to determine that the type of the content image is a game moving image based on detection of a game system connected to the image transmitting device.

12. The image transmitting device according to claim 1, wherein the processor is further configured to determine that the type of the content image is a game moving image based on a received input setting a mode of the image transmitting device to a game mode.

13. The image transmitting device according to claim 9, wherein the processor is further configured to determine that the external device is a game machine based on a received input setting a mode of the image transmitting device to a game mode.

\* \* \* \* \*